United States Patent [19]

Leach

[11] Patent Number: 4,610,840

[45] Date of Patent: Sep. 9, 1986

[54] FISSION PRODUCT SCRUBBING SYSTEM FOR A NUCLEAR REACTOR

[75] Inventor: Dirk S. Leach, Murrysville Boro, Pa.

[73] Assignee: Westinghouse Electric Corp., Pittsburgh, Pa.

[21] Appl. No.: 686,770

[22] Filed: Dec. 27, 1984

[51] Int. Cl.$^4$ .............................................. G21C 9/00
[52] U.S. Cl. ................................... 376/283; 376/310; 55/256
[58] Field of Search .................. 55/256, 227; 376/310, 376/282, 283

[56] References Cited

U.S. PATENT DOCUMENTS

| | | | |
|---|---|---|---|
| 3,105,028 | 9/1963 | Long | 376/310 |
| 3,459,635 | 8/1969 | Bevilacqua et al. | 376/313 X |
| 4,210,614 | 7/1980 | Kleimola | 376/313 X |
| 4,416,850 | 11/1983 | Kodama et al. | 376/313 X |

FOREIGN PATENT DOCUMENTS 26705 4/1981 European Pat. Off. ............ 376/282

Primary Examiner—Deborah L. Kyle
Assistant Examiner—John S. Maples
Attorney, Agent, or Firm—Daniel C. Abeles

[57] ABSTRACT

A fission product scrubbing system comprises a water tank in the containment building; a dividing wall extending into the water tank for separating it into first and second compartments; a collection plenum normally hermetically sealed from the containment space and the environment externally of the containment building and being at least in part formed by the dividing wall and the level of water stored in the second compartment and a communication passage in the dividing wall underneath the water level in the first and second compartments for maintaining communication between the water stored therein. There is further provided a standpipe which extends from the containment space into the second compartment and which has flow distribution holes situated in the second compartment below the water level and above the communication passage, whereby gases passing from the containment space into the standpipe travel upwardly from the distribution holes through the water into the collection plenum. A vent pipe extends from the collection plenum into the environment externally of the containment building and further, a rupture disc is mounted in the vent pipe for normally blocking communication between the collection plenum and the environment. The rupture disc is designed for blowing out in response to a predetermined pressure prevailing in the collection plenum to provide for a free passage of gases from the collection plenum towards the atmosphere through the vent pipe.

7 Claims, 3 Drawing Figures

FISSION PRODUCT SCRUBBING SYSTEM FOR A NUCLEAR REACTOR

BACKGROUND OF THE INVENTION

1. Field of the Invention

This invention relates to a safety system for protecting the environment from radioactive contamination from a nuclear plant in case of nuclear accidents, particularly of the type where all containment safeguards have failed and containment failure is imminent. Such accidents are generally classified as being of the class 9 type which would involve fuel damage in the reactor vessel, pipe breakages and loss of heat removal, leading to a melting of reactor core and its collapsing to the bottom of the containment building. During such occurrences, hot steam and gases carrying radioactive fission products are released into the containment building and build up a pressure which may lead to containment failure, manifesting itself by a discharge of the steam and gases from the containment building, for example, through cracks and pipe fittings. Such a discharge of radioactive vapors and gases poses a threat to the environment and heretofore no provisions have been made to control the outflow of gases from the containment building of a nuclear reactor and to scrub such gases from fission products as a last safety measure when containment failure is imminent, particularly as a result of a nuclear accident of the class 9 type.

2. Description of the Prior Art

Treating gases which have escaped into the containment area as a result of an accident, by removing at least one part of the fission products therefrom prior to their release to the atmosphere is generally known. F. W. Kleimola U.S. Pat. No. 4,210,614 discloses a passive protection system in case of a loss of coolant accident in a nuclear power plant. Among other measures to prevent the melting of fuel and to enhance a rapid decrease of pressure in the containment building, the pressure of the steam released into the containment building as a result of an accident breaks rupture discs in deluge tanks. The liquid in the deluge tanks contains fission product "getters" for reducing the radioactivity of the vapors and gases in the containment building. This system presupposes a successful retention of the gases and vapors within the containment building and makes no provision for a final treatment of gases when escape thereof from the containment building is unavoidable.

Bevilacqua et al U.S. Pat. No. 3,459,635 discloses a system which, in case of an accident, guides the pressurized vapor from the containment area into containers where the vapors are condensed by a liquid stream. Further, the atmosphere of the containment is circulated through the containers and through a serially connected conventional filtering and purifying arrangement for removing radioactive material from the gases. Thereafter the gases are reintroduced into the containment area or, if sufficiently purified, released to the atmosphere. The vapor circuit through the purifying arrangement is maintained in motion by a circulating pump.

Long U.S. Pat. No. 3,105,028 provides, in case of an accident, for a coolant removal from the reactor system into a gas tank and therefrom into a carbon dioxide absorption tower in which, among others, solid fission product fragments are retained.

Kodama et al U.S. Pat. No. 4,416,850 discloses a spraying system installed in a primary containment vessel to condense the radioactive vapor which fills the vessel and to cool the gases therein. Radioactive water-soluble gases are dissolved in the sprayed water. Thereafter sprayed and condensed water are separated.

While the above-outlined prior art systems provide, to a certain extent, for the removal of fission products from the gases and vapors which build up pressure in the containment as a result of an accident, such safety systems have not been designed for a final treatment of the gases and vapors when containment failure is imminent and a direct discharge of the containment atmosphere into the surrounding environment is unavoidable.

SUMMARY OF THE INVENTION is an object of the invention to provide, in a nuclear plant, a passive safety system of simple construction which, when containment failure is imminent, ensures a high-efficiency scrubbing of gases and vapors to strip them of fission products just prior to their release into the atmosphere and which prevents containment failure by providing a controlled pressure reduction in the containment space by release of the purified gases and vapors.

This object and others to become apparent as the specification progresses, are accomplished by the invention, according to which, briefly stated, the fission product scrubbing system comprises a water tank in the containment building; a dividing wall extending into the water tank for separating it into first and second compartments; a collection plenum normally hermetically sealed from the containment space and the environment externally of the containment building and being at least in part formed by the dividing wall and the level of water stored in the second compartment and a communication passage in the dividing wall underneath the water level in the first and second compartments for maintaining communication between the water stored therein. There is further provided a standpipe which extends from the containment space into the second compartment and which has flow distribution holes situated in the second compartment below the water level and above the communication passage, whereby gases passing from the containment space into the standpipe travel upwardly from the distribution holes through the water into the collection plenum. A vent pipe extends from the collection plenum into the environment externally of the containment building and further, a rupture disc is mounted in the vent pipe for normally blocking communication between the collection plenum and the environment. The rupture disc is designed for blowing out in response to a predetermined pressure prevailing in the collection plenum to provide for a free passage of gases from the collection plenum towards the atmosphere through the vent pipe.

DESCRIPTION OF THE PREFERRED EMBODIMENT

Figure 1:
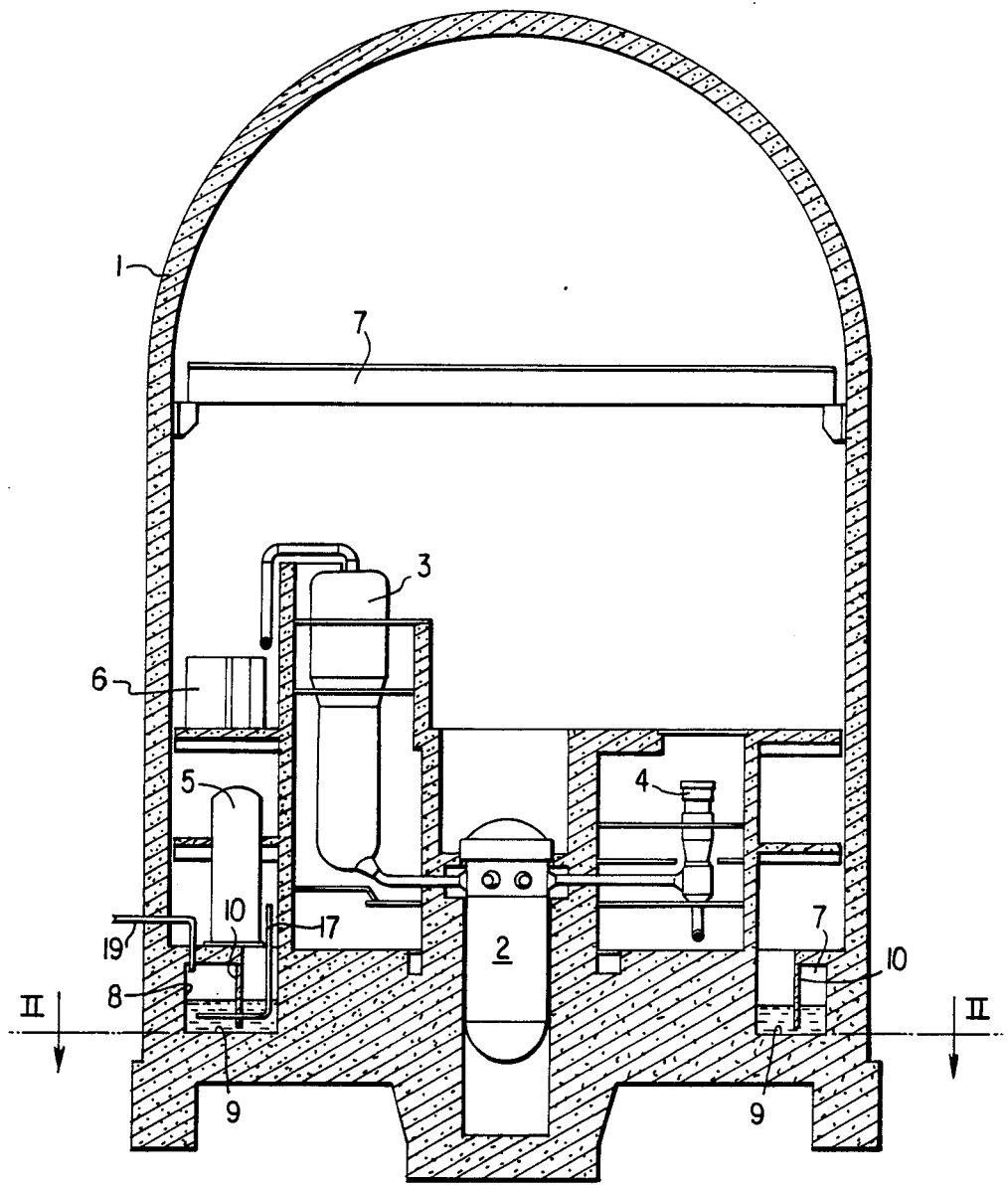
FIG. 1 is a schematic sectional elevation of a containment building with principal components of a pressurized water reactor and a preferred embodiment of the invention.

Turning now to FIG. 1, there is schematically illustrated a pressurized water reactor including a containment building 1 (generally of concrete) which houses components of the nuclear reactor, such as a reactor vessel 2, a steam generator 3, a reactor coolant pump 4, an accumulator tank 5, a containment fan 6 and an overhead polar crane 7. Since all these components and their relationships are known and further, since they do not specifically cooperate, structurally or functionally, with the invention, they are not described or illustrated in greater detail.

While the preferred embodiment of the invention is described in connection with a dry pressurized water reactor, it is to be understood that the system according to the invention is equally applicable to nuclear reactors of any other design.

Figure 2:
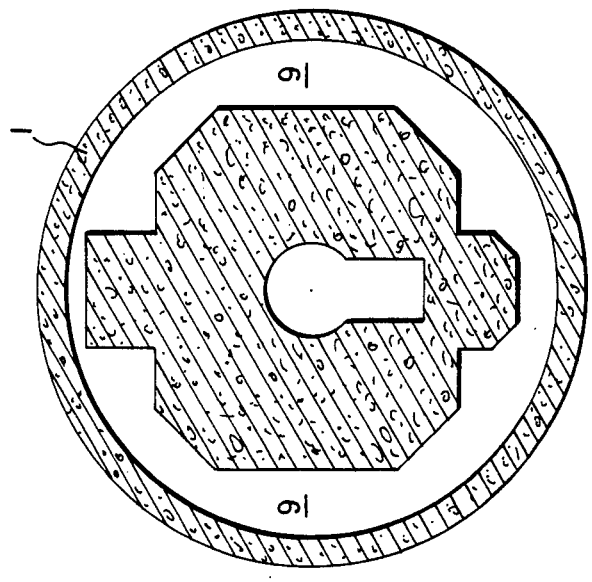
FIG. 2 is a schematic sectional view taken along line II—II of FIG. 1.

An essential component of the invention is a water tank 8 which is situated in the containment building 1 and which extends annularly, generally concentrically with the central vertical axis of the containment building 1. The tank 8 has a floor 9 whose configuration may be particularly well seen in FIG. 2. In the present embodiment the water tank 8 also constitutes an emergency water storage tank which, in a known manner, serves to resupply the reactor vessel with water in case of a pipe rupture. The water tank, as a component of the invention, however, need not be the emergency water storage tank, it may be, in principle, a separately provided reservoir of any desired shape, having a capacity of greater than 250,000 gallons.

Figure 3:
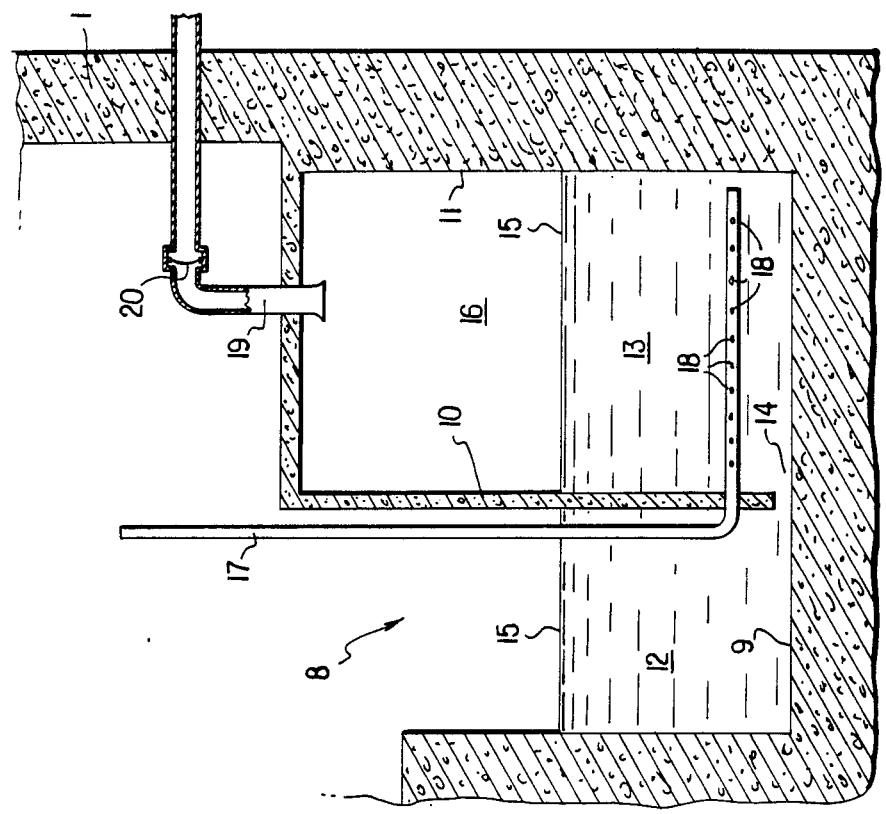
FIG. 3 is a sectional elevation of the preferred embodiment, drawn on an enlarged scale with respect to that of FIGS. 1 and 2.

Also referring to FIG. 3, a dividing wall 10 extends from the top of a side wall 11 of the tank 8 horizontally and then drops substantially vertically to the immediate vicinity of the floor 9 to thus separate the water tank 8 into an open compartment 12 and an enclosed compartment 13. The two compartments 12 and 13 are in communication with one another by means of a continuous passage 14 which is defined by the lowermost edge of the dividing wall 10 and the tank floor 9 and which may have a height of a few inches. It is also feasible to extend the dividing wall 10 into engagement with the floor 9 and provide a horizontal series of communication passages. By virtue of the communication passage 14 the level 15 of the water in two compartments 12 and 13 of the tank 8 is at the same height assuming the same pressures above the water on either side of the dividing wall 10. The water level 15 in the enclosed compartment 13, the dividing wall 10 as well as the side wall 11 of the water tank 8 together define a hermetically closed collection plenum 16.

From the containment space externally of the collection plenum 16 there extend standpipes 17 (only one shown in FIGS. 1 and 3) vertically into the open compartment 12 and then horizontally traverse the vertical portion of the dividing wall 10 to project into the enclosed compartment 13 where each standpipe 17 is provided with a series of flow distribution holes 18. Each standpipe 17 may typically have an inner diameter of 6 inches while the sum of the areas of the flow distribution holes 18 should be not less than the area of the associated standpipe 17 to ensure that the flow distribution holes 18 do not constitute a restriction of flow through the standpipe.

A vent pipe 19 having an inner diameter of, for example, 6 inches, extends from the upper part of the collection plenum 16 to the outside of the containment building 1 and may be connected, for example, to an off-gas stack (not shown). Appropriate seals provide for a gastight passage of the vent pipe 19 through the dividing wall 10 and the wall structure of the containment building 1.

During normal operation of the nuclear reactor the vent pipe 19 is blocked by a rupture disc 20 which is of conventional structure and which is designed to blow out at a pressure of approximately 110–150 psi for a typical large dry containment and may be lower for other types. This pressure must be below the failure pressure of the containment building 1.

In the description which follows, the operation of the above-described safety system will be set forth.

The safety system according to the invention is in its inoperative, standby state as long as the rupture disc 20 is intact.

During normal operation of the nuclear reactor, generally ambient atmospheric pressure prevails in the space within the containment building 1 and there is a pressure equilibrium between the collection plenum 16 and the space within the containment building 1.

If, as a result of a reactor accident, steam and gases escape from the primary system of the reactor into the space defined by the containment building 1, the pressure therein will increase to a point where the pressure on the water surface in the open compartment 12 serves to drive water from the open compartment 12 into the enclosed compartment 13 through the passage 14. This will serve to increase the pressure in the collection plenum 16 to a magnitude equal to that of the pressure in the containment building 1.

When the rupture pressure of the rupture disc 20 is exceeded, causing blowout thereof, the water level in the open compartment 12 will drop to the level of the horizontal section of the standpipe 17 while the water level in the enclosed compartment 13 will rise accordingly and the flow of radioactive gases and vapors from the containment building 1 into the collection plenum 16 will commence. The gases and vapors must pass through the distribution holes 18 into the water in the enclosed compartment 13 and then travel therein upwardly into the collection plenum 16 from which they exit through the now-open vent pipe 19. As the gases and vapors pass through the water in the enclosed compartment 13, a large majority of the fission products (exceeding 98%, excluding noble gases) will be scrubbed (removed) from the steam and gases by the water. As a result, the gases emerge from the water in the enclosed compartment 13 and pass through the vent pipe 19 in a substantially purified state. Thus, the system according to the invention prevents containment failure in that it provides a controlled pressure reduction in the containment space by releasing purified gases and vapors into the atmosphere, resulting in a significantly reduced impact on the environment as compared to other known systems.

For an efficient and satisfactory operation of the system according to the invention, the following positional and dimensional relationships should preferably be observed:

The flow distribution holes 18 in the standpipes 17 should be at a height level which is sufficiently above the height level of the communication passage 14 to securely prevent gases emitted into the water in the enclosed compartment 13 from passing through the communication passage 14 into the water held in the open compartment 12. Such an occurrence would cause the purified gases to again mix with the still contaminated gases and vapors above the water within the containment building. It has been estimated that the flow distribution holes 18 should be, for this purpose, expediently at least 10–12 inches above the communication passage 14.

Further, the total volume of the collection plenum 16 should be at least 1.5 times that of the volume of the water in the open compartment 12 of the water tank 8. This minimum ratio ensures that, in response to the pressure build-up in the space within the containment building, a sufficiently large gas space will exist in the collection plenum 16 when the rupture disc 20 ruptures.

Also, the total cross-sectional flow area of the standpipes 17 should be at least twice that of the vent pipe 19 and the latter should have an inner diameter of at least 4 inches. These relationships will ensure that during operation of the system under high pressures, a sonic velocity of the gases will be first reached in the vent pipe 19 and thus the accompanying phenomenon of choked flow will occur in the vent pipe 19 rather than in the standpipes 17. This ensures a continuous outflow of the purified gases from the collection plenum 16.

The above-described system according to the invention provides for a reliable decontamination of radioactive gases and vapors prior to their discharge into the atmosphere when containment failure is imminent. The reliability of the system is ensured by its simplicity and particularly by the fact that it is a passive system not dependent upon the operation of pumps, sensors and the like which are characteristic of active safety systems and which may fail in case of a nuclear accident for which the present system according to the invention is designed.

It will be understood that the above description of the present invention is susceptible to various modifications, changes and adaptations, and the same are intended to be comprehended within the meaning and range of the appended claims.

I claim:

1. A fission product scrubbing system for a nuclear reactor including a containment building defining a containment space for accommodating reactor components, comprising
   (a) means defining a water tank in said containment building;
   (b) a dividing wall extending into said water tank for separating said water tank into a first and a second compartment; said first compartment being in an open communication with the containment space, whereby water stored in said first compartment has a water level directly exposed to the atmosphere in the containment space;
   (c) means defining a collection plenum normally hermetically sealed from the containment space and the environment externally of said containment building; said means defining said collection plenum being at least in part formed by said dividing wall and the level of water stored in said second compartment;
   (d) means defining a communication passage in said dividing wall underneath the water level in said first and second compartments for maintaining communication between the water stored in said first and second compartments;
   (e) a standpipe extending from said containment space into said second compartment; said standpipe having an opening situated in said containment space and flow distribution holes situated in said second compartment below the water level therein and at a height above that of said communication passage whereby gases passing from said containment space into said standpipe travel upwardly from said distribution holes through the water into said collection plenum;
   (f) a vent pipe extending from said collection plenum into the environment externally of said containment building; and
   (g) a rupture disc mounted in said vent pipe for normally blocking communication between said collection plenum and the environment; said rupture disc being designed for blowing out in response to a predetermined pressure below the containment failure pressure prevailing in said collection plenum to provide for a free passage of gases from the collection plenum towards the atmosphere through said vent pipe.

2. A fission product scrubbing system as defined in claim 1, wherein said standpipe passes through said dividing wall.

3. A fission product scrubbing system as defined in claim 1, wherein the vertical distance of the distribution holes from said communication passage is at least 10–12 inches.

4. A fission product scrubbing system as defined in claim 1, wherein said vent pipe has an inner diameter of at least 4 inches.

5. A fission product scrubbing system as defined in claim 1, wherein the volume of the collection plenum is at least 1.5 times larger than the volume of water stored in said first compartment.

6. A fission product scrubbing system as defined in claim 1, wherein said standpipe has a total flow passage area at least twice greater than a total flow passage area of said vent pipe.

7. A fission product scrubbing system for a nuclear reactor including a containment building defining a containment space for accommodating reactor components, comprising
   (a) means defining a water tank in said containment building;
   (b) a dividing wall extending into said water tank for separating said water tank into a first and a second compartment; said first compartment being in an open communication with the containment space, whereby water stored in said first compartment has a water level directly exposed to the atmosphere in the containment space;
   (c) means defining a collection plenum normally hermetically sealed from the containment space and the environment externally of said containment building; said means defining said collection plenum being at least in part formed by said dividing wall and the level of water stored in said second compartment;
   (d) means defining a communication passage in said dividing wall underneath the water level in said first and second compartments for maintaining communication between the water stored in said first and second compartments;
   (e) means defining a gas passage leading into said second compartment and having a first opening situated externally of said second compartment and arranged for direct communication with said containment space; said gas passage further having a second opening situated within said second compartment below the water level therein and at a height above that of said communication passage whereby gases passing from said containment space into said gas passage travel upwardly from said second opening through the water into said collection plenum;

(f) a vent pipe extending from said collection plenum into the environment externally of said containment building; and (g) a rupture disc mounted in said vent pipe for normally blocking communication between said collection plenum and the environment; said rupture disc being designed for blowing out in response to a predetermined pressure below the containment failure pressure prevailing in said collection plenum to provide for a free passage of gases from the collection plenum towards the atmosphere through said vent pipe.

* * * * *